US012641435B2

(12) United States Patent
Werner et al.

(10) Patent No.: US 12,641,435 B2
(45) Date of Patent: May 26, 2026

(54) MODIFYING DEVICE SECURITY STATE WITH SECURE RANGING

(71) Applicant: Apple Inc., Cupertino, CA (US)

(72) Inventors: Benjamin A. Werner, San Jose, CA (US); Wade Benson, Sunnyvale, CA (US); Rachel E. Miller, Santa Clara, CA (US); Brian G. Kilberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 18/509,220

(22) Filed: Nov. 14, 2023

(65) Prior Publication Data

US 2024/0406735 A1      Dec. 5, 2024

Related U.S. Application Data

(60) Provisional application No. 63/470,826, filed on Jun. 2, 2023.

(51) Int. Cl.
| | |
|---|---|
| *G06F 7/04* | (2006.01) |
| *G06F 15/16* | (2006.01) |
| *H04L 29/06* | (2006.01) |
| *H04W 12/06* | (2021.01) |
| *H04W 12/08* | (2021.01) |
| *H04W 12/61* | (2021.01) |

(52) U.S. Cl.
CPC ........... *H04W 12/61* (2021.01); *H04W 12/06* (2013.01); *H04W 12/08* (2013.01)

(58) Field of Classification Search
CPC ...... H04W 12/61; H04W 12/06; H04W 12/08

USPC .............................................................. 726/4
See application file for complete search history.

(56) References Cited

U.S. PATENT DOCUMENTS

2019/0171465 A1*   6/2019   Benson ................. H04L 63/108
2019/0208421 A1    7/2019   Ziraknejad et al.
(Continued)

FOREIGN PATENT DOCUMENTS

WO      WO 2020/214833        10/2020
WO      WO-2020214833 A1 *   10/2020   ............ H04W 12/64

OTHER PUBLICATIONS

International Search Report and Written Opinion from PCT/US2024/030645, dated Aug. 7, 2024, 14 pages.
(Continued)

*Primary Examiner* — Jeffrey C Pwu
*Assistant Examiner* — Samuel Ambaye
(74) *Attorney, Agent, or Firm* — BAKERHOSTETLER

(57)      ABSTRACT
The subject technology provides a framework for a trusted device to modify a security state of a target device (e.g., not fully unlocking the target device by activating biometric authentication at the target device) based on a secure ranging operation. The subject technology enables the trusted device to establish a secure and authenticated connection with the target device that is used to activate biometric authentication at the target device. The biometric authentication may fully unlock the target device. The trusted device may be able to activate the biometric authentication at the target device when the trusted device is in an unlocked state, or even when the trusted device is in a locked state so long as less than a threshold amount of time has passed since the trusted device was last unlocked.

17 Claims, 9 Drawing Sheets

(56) References Cited

U.S. PATENT DOCUMENTS

| | | | |
|---|---|---|---|
| 2020/0106877 A1 * | 4/2020 | Ledvina | ................ H04W 12/06 |
| 2021/0279320 A1 | 9/2021 | Robinson et al. | |

OTHER PUBLICATIONS

International Preliminary Report on Patentability from PCT/US2024/
030645, dated May 9, 2025, 9 pages.

* cited by examiner

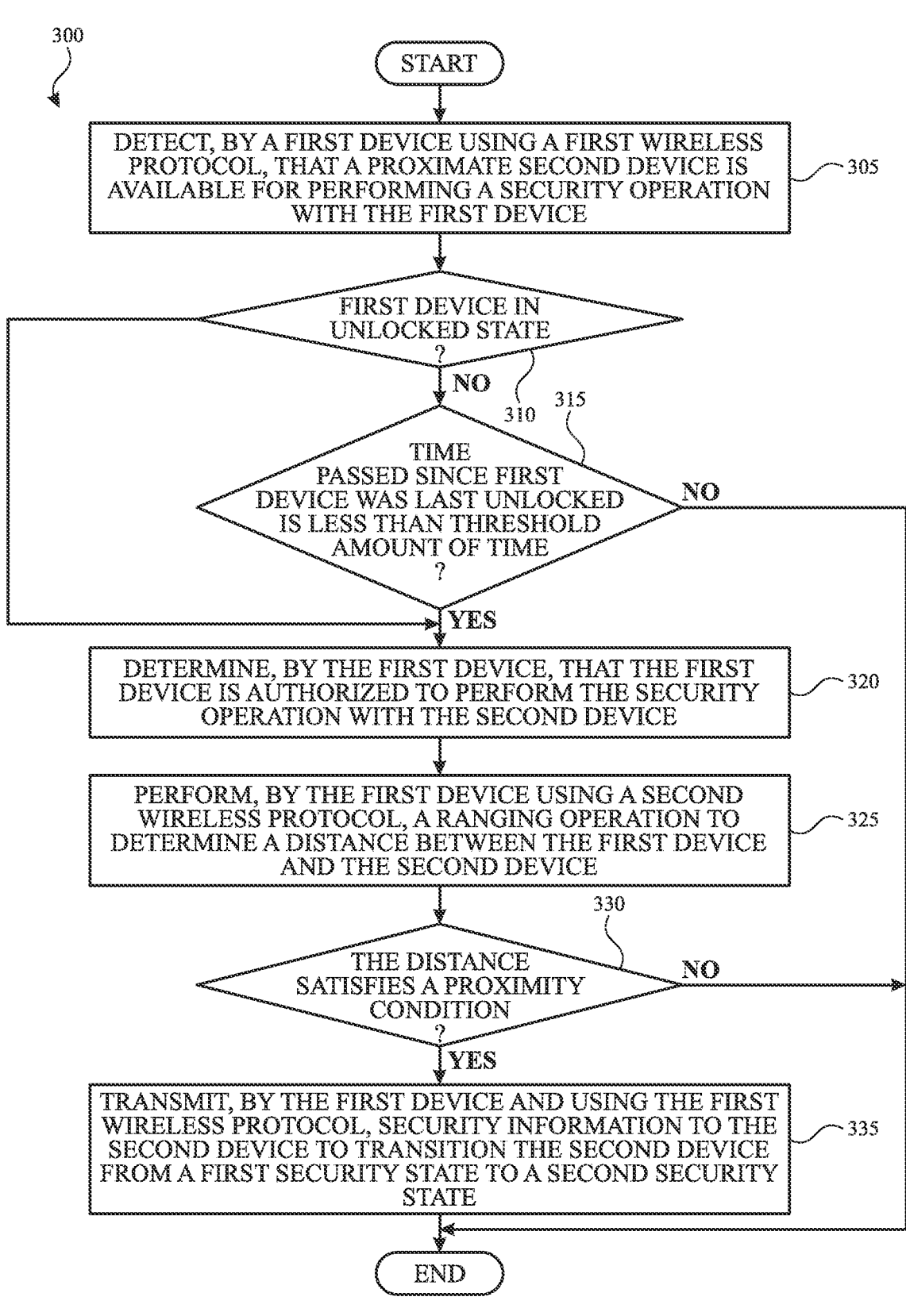

300

START

DETECT, BY A FIRST DEVICE USING A FIRST WIRELESS PROTOCOL, THAT A PROXIMATE SECOND DEVICE IS AVAILABLE FOR PERFORMING A SECURITY OPERATION WITH THE FIRST DEVICE — 305

FIRST DEVICE IN UNLOCKED STATE ? — 310

NO

315

TIME PASSED SINCE FIRST DEVICE WAS LAST UNLOCKED IS LESS THAN THRESHOLD AMOUNT OF TIME ?

NO

YES

DETERMINE, BY THE FIRST DEVICE, THAT THE FIRST DEVICE IS AUTHORIZED TO PERFORM THE SECURITY OPERATION WITH THE SECOND DEVICE — 320

PERFORM, BY THE FIRST DEVICE USING A SECOND WIRELESS PROTOCOL, A RANGING OPERATION TO DETERMINE A DISTANCE BETWEEN THE FIRST DEVICE AND THE SECOND DEVICE — 325

330

THE DISTANCE SATISFIES A PROXIMITY CONDITION ?

NO

YES

TRANSMIT, BY THE FIRST DEVICE AND USING THE FIRST WIRELESS PROTOCOL, SECURITY INFORMATION TO THE SECOND DEVICE TO TRANSITION THE SECOND DEVICE FROM A FIRST SECURITY STATE TO A SECOND SECURITY STATE — 335

END

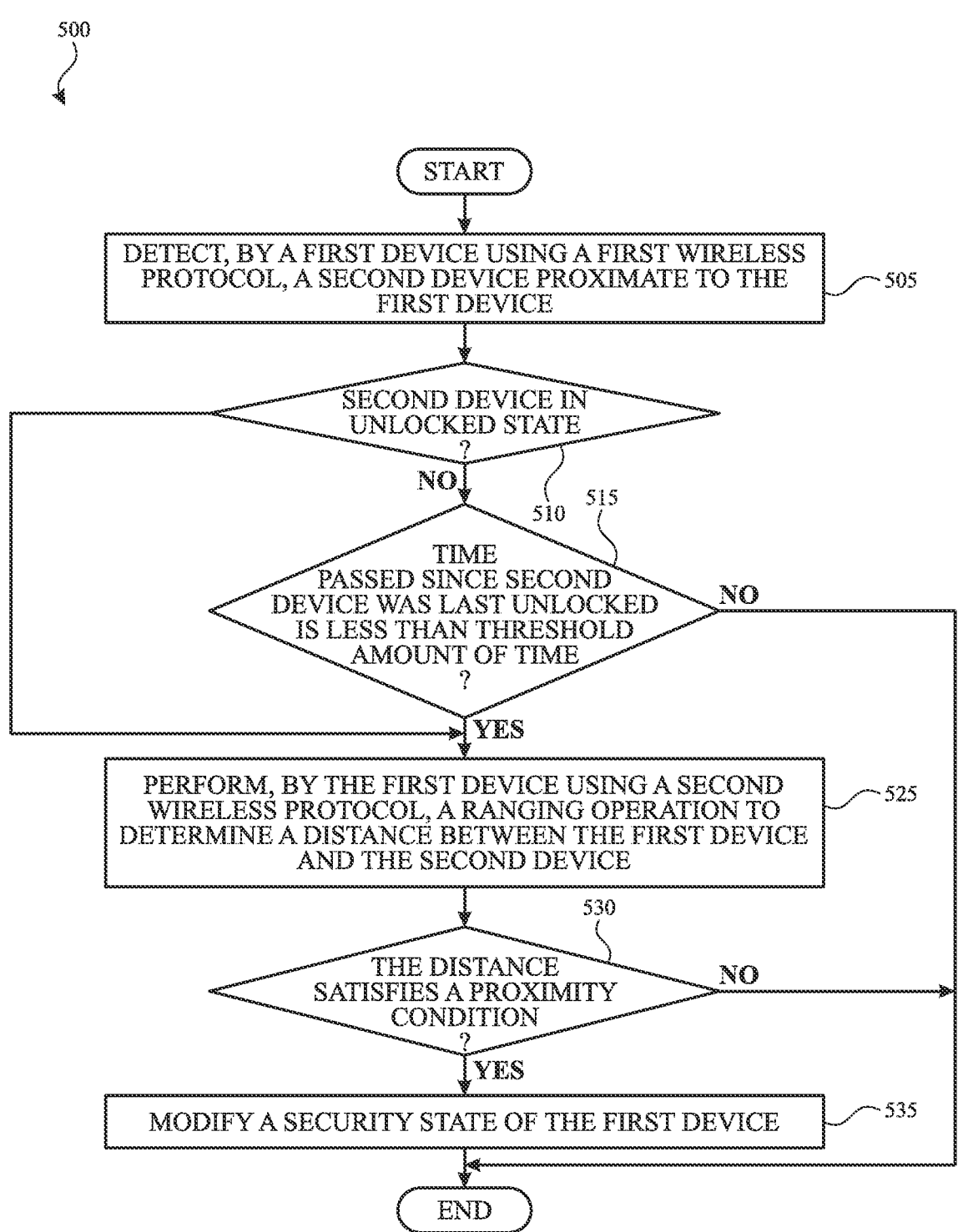

START

DETECT, BY A FIRST DEVICE USING A FIRST WIRELESS PROTOCOL, A SECOND DEVICE PROXIMATE TO THE FIRST DEVICE ~ 505

SECOND DEVICE IN UNLOCKED STATE ?  
510  515

NO

TIME PASSED SINCE SECOND DEVICE WAS LAST UNLOCKED IS LESS THAN THRESHOLD AMOUNT OF TIME ?          NO

YES

PERFORM, BY THE FIRST DEVICE USING A SECOND WIRELESS PROTOCOL, A RANGING OPERATION TO DETERMINE A DISTANCE BETWEEN THE FIRST DEVICE AND THE SECOND DEVICE ~ 525

530

THE DISTANCE SATISFIES A PROXIMITY CONDITION ?          NO

YES

MODIFY A SECURITY STATE OF THE FIRST DEVICE ~ 535

END

*FIG. 5*

MODIFYING DEVICE SECURITY STATE WITH SECURE RANGING

CROSS-REFERENCE TO RELATED APPLICATION(S)

This application claims the benefit of U.S. Provisional Application Ser. No. 63/470,826, entitled "MODIFYING DEVICE SECURITY STATE WITH SECURE RANG-ING," and filed on Jun. 2, 2023, the disclosure of which is expressly incorporated by reference herein in its entirety.

TECHNICAL FIELD

The present description relates generally to modifying a security state of a device, including modifying a device security state with secure ranging.

BACKGROUND

Devices with constrained input devices can present several challenges when it comes to providing security credentials. The small size of the input device and limited user interface can make it tedious for users to enter security credentials or use other forms of authentication that require significant input.

BRIEF DESCRIPTION OF THE DRAWINGS

The novel features of the subject technology are set forth in the appended claims. However, for purposes of explanation, several embodiments of the subject technology are set forth in the following figures.

FIG. 3 conceptually illustrates a process for a trusted device to use secure ranging to modify a security state of a target device.

FIG. 5 conceptually illustrates a process for a target device to use secure ranging with a trusted device to modify a security state of the target device.

DETAILED DESCRIPTION

Figure 1:
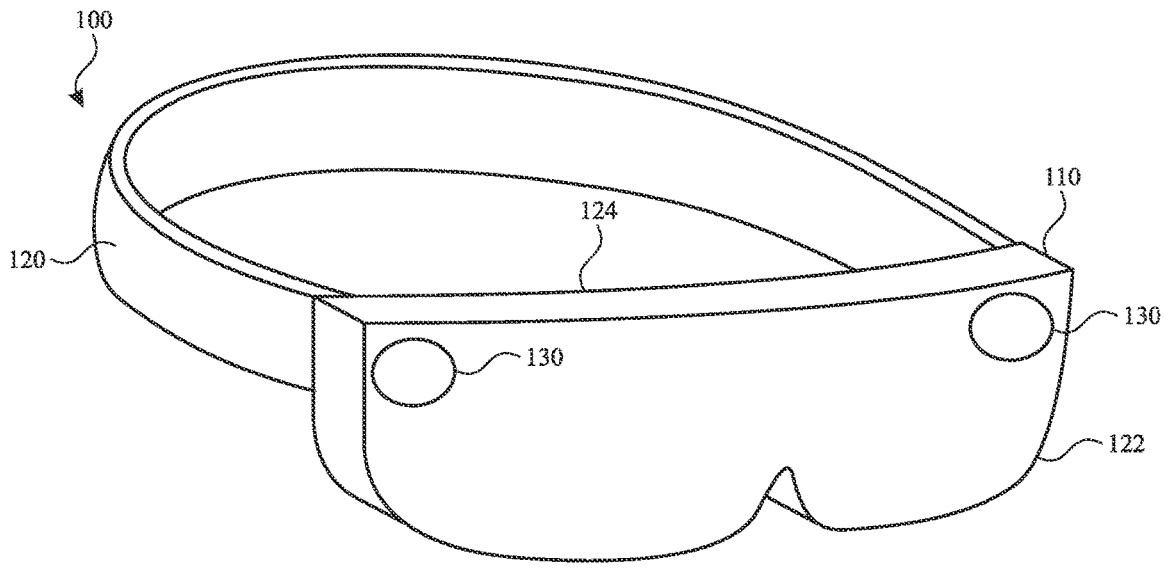
FIG. 1 illustrates a perspective view of a head-mountable device on a user, according to some embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In order to provide a balance of security and convenience, a trusted device (e.g., desktop devices, mobile devices, wearable devices, etc.) may be used to unlock (or otherwise modify a security state of) a target device. For example, a locked target device may automatically unlock in the presence of a trusted device, or may otherwise accept commands from the trusted device (e.g., via user input) to unlock the target device, allowing a user to avoid having to manually interact with the target device to unlock it. However, an unauthorized user can obtain access to the target device when unlocked, allowing the unauthorized user to have access to sensitive user data on the target device. It is desirable to provide more secure methods before allowing a target device to be unlocked.

Some embodiments of the subject technology provide a method for using a trusted device to modify a security state at a target device (e.g., preparing the target device to be unlocked without fully unlocking the target device). The target device is the device to be unlocked, while the trusted device is a device that has been authorized to modify the security state of the target device. For example, the subject technology provides for the trusted device to modify the security state of the target device based on a secure ranging operation.

The subject technology enables the trusted device to establish a secure and authenticated connection with the target device that is used to perform a security operation at the target device, such as partially unlocking the target device. For example, if the target device can only be unlocked by biometric authentication after having been previously unlocked (e.g., after the last power cycle) via user input of a security credential (e.g., a password), the security operation may function as a substitute of the user input of the password leaving the target device in a state where it can be unlocked by biometric authentication. Thus, the security operation at the target device may be referred to as "activating" or "arming" the biometric authentication for unlocking the target device. In one more implementations, the trusted device may be able to activate the biometric authentication at the target device even when the trusted device is in a locked state, so long as less than a threshold amount of time has passed since the trusted device was last unlocked.

In some embodiments, one part of the security protocol for determining whether to allow a trusted device to modify a security state of a target device is based on whether the trusted device is unlocked or less than a threshold amount of time has passed since the trusted device was unlocked. The method of some embodiments uses the unlocking state of the trusted device to determine whether the trusted device is or has been recently active by way of receiving interactions from an authorized user before allowing the trusted device to modify the security state of the target device.

In some embodiments, the other part of the security protocol for determining whether to allow a trusted device to modify a security state of a target device is based on a set of ranging operations (e.g., determining a distance, proximity, etc.). The method of some embodiments uses ranging (e.g., distance, proximity, etc.) information to determine whether the trusted and target devices are within a specified range of each other before allowing the trusted device to modify the security state of the target device. For example, the target and trusted devices (e.g., laptop computers, mobile phones, tablets, etc.) of some embodiments perform one or more ranging operations to compute sample distance measurements between the trusted and target devices. Once the sample distance measurements have been captured, the trusted device determines whether the sample distance measurements meet a particular set of criteria (e.g., whether the devices satisfy a proximity condition), and, when the calculated composite distance measurement satisfies the proximity condition, exchanges security information with the target device to modify the security state (e.g., arming biometric authentication) at the target device. In some embodiments, modifying the security state includes switching between unlocking steps in a two-step unlocking procedure or unlocking access to allow the target device to be unlocked by biometric authentication or by passcode. For example, a trusted device, such as a mobile device, can arm a target device, such as a head-mountable device, by not fully unlocking the head-mountable device and allowing the head-mountable device to be unlocked only by biometric authentication or by providing a passcode.

In some embodiments, the trusted device is established as a trusted device through an authorization (or pairing) process with the target device. The authorization process allows a user to grant the trusted device permission to arm (or otherwise modify the security state of) the target device. The trusted device of some embodiments receives a security token or other shared secret during the authorization process that can be used in future sessions to modify the security state of the target device. Once a trust relationship has been established between the target device and the trusted device, the trusted device can be used to modify the security state of the target device.

These and other embodiments are discussed below with reference to FIGS. 1-10. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 110 that is worn on a head of a user. The frame 110 can be positioned in front of the eyes of a user to provide information within a field of view of the user. The frame 110 can provide nose pads or another feature to rest on a user's nose. The frame 110 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 120 can include multiple components to engage a user's head.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. Any number of components can be included within and/or on the frame 110 and/or the securement element 120.

The head-mountable device 100 can include a camera 130 for capturing a view of an environment external to the head-mountable device 100. The camera 130 can include an optical sensor, such as a photodiode or a photodiode array. Additionally or alternatively, the camera 130 can include one or more of various types of optical sensors that are arranged in various configurations for detecting user inputs described herein. The camera 130 may be configured to capture an image of a scene or subject located within a field of view of the camera 130. The image may be stored in a digital file in accordance with any one of a number of digital formats. In some embodiments, the head-mountable device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The frame 110 can include and/or support one or more cameras 130. The cameras 130 can be positioned on or near an outer side 122 of the frame 110 to capture images of views external to the head-mountable device 100. As used herein, an outer side of a portion of a head-mountable device is a side that faces away from the user and/or towards an external environment. The captured images can be used for display to the user or stored for any other purpose.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc.

Figure 2:
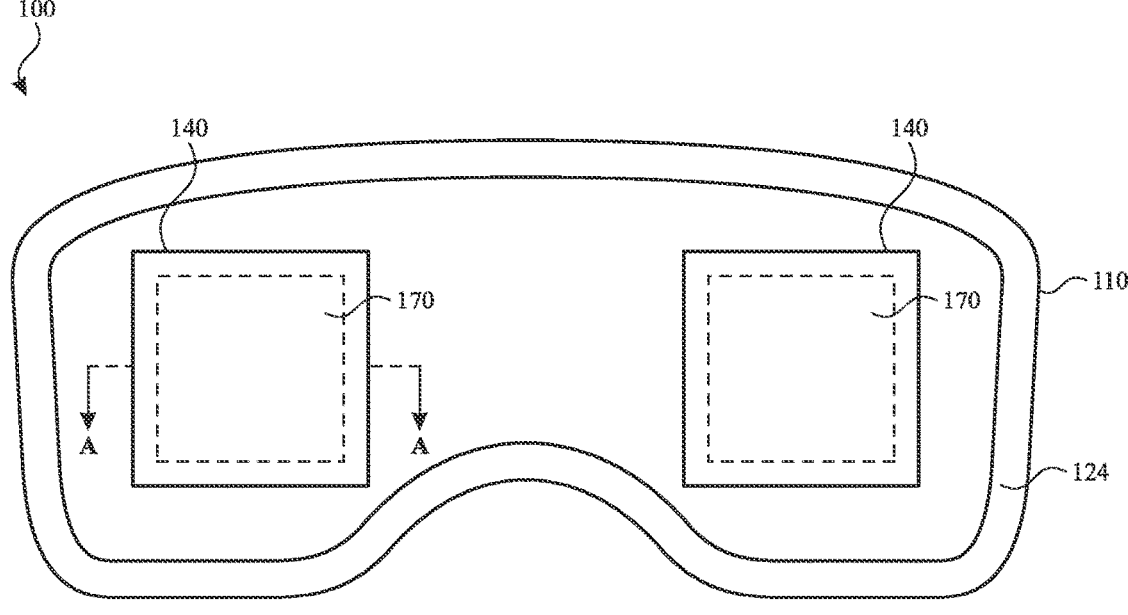
FIG. 2 illustrates a rear view of a head-mountable device, according to some embodiments of the present disclosure.

Referring now to FIG. 2, a head-mountable device can be provided with optical modules that provide visual output for viewing by a user wearing the head-mountable device. As shown in FIG. 2, one or more optical modules 140 can be positioned on an inner side 124 of the frame 110. As used herein, an inner side of a portion of a head-mountable device is a side that faces toward the user and/or away from the external environment. For example, a pair of optical modules 140 can be provided, where each optical module 140 is movably positioned to be within the field of view of each of a user's two eyes. Each optical module 140 can be adjusted to align with a corresponding eye of the user. For example, each optical module 140 can be moved along one or more axes until a center of each optical module 140 is aligned with a center of the corresponding eye. Accordingly, the distance between the optical modules 140 can be set based on an interpupillary distance of the user. For example, one or more module actuators can be provided to move the optical module 140 relative to the frame 110 of the head-mountable device 100. Each optical module 140 can include a display element 170 for displaying visual information for a user.

Movement of each of the optical modules can match movement of a corresponding camera module. For example, each optical module 140 can be supported on the inner side 124 of the frame 110, and a camera 130 can be coupled to and movable with a corresponding one of the optical modules 140. The optical module 140 can be adjusted to align with the corresponding eye of the user, and the camera 130 can be correspondingly adjusted so that the field of view provided by the optical module 140 corresponds to a field of view captured by the camera 130. Accordingly, the optical module 140 is able to accurately reproduce, simulate, or augment a view based on a view captured by the camera 130 with an alignment that corresponds to the view that the user would have naturally without the head-mountable device 100.

In some implementations, the optical module 140 may include a bio-sensor, such as an iris scanner, to perform a secure biometric authentication method by authenticating an individual's identity based on the unique pattern of the individual's iris. The iris is the colored part of the eye that surrounds the pupil and contains many intricate and complex patterns that are unique to each individual. The iris scanner may capture an image of the individual's iris and uses one or more algorithms to compare it with a previously stored template of the same individual's iris. If the patterns match, the individual is authenticated and granted access to the device or system they are attempting to access.

In some implementations, the iris scanner may be secured from unauthorized access through physical security. For example, the iris scanner can be placed in a secure enclave on the inner side 124 of the frame 110, such that the secure enclave can be unlocked based on user permissions or other security settings. In one or more implementations, the secure enclave may refer to a protected and/or isolated area within the head-mountable device 100.

An optical module 140 can transmit light from a physical environment (e.g., as captured by a camera module) for viewing by the user. Such an optical module 140 can include optical properties, such as lenses for vision correction based on incoming light from the physical environment. Additionally or alternatively, an optical module 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Head-mountable devices also have security features to prevent unauthorized access to the device and user personal data. For example, head-mountable devices may implement user authentication that require users to log in with a username and password before they can use the device. In another example, head-mountable devices may implement physical security features such as biometric authentication, proximity sensors, or locking mechanisms to prevent theft or unauthorized access to the device.

Some embodiments allow a user to modify the security state of a target device (e.g., unlocking) based on a relationship (e.g., proximity) with a trusted device. FIG. 3 conceptually illustrates a process 300 for a trusted device to use secure ranging to modify a security state of a target device. The process 300 is performed by the trusted device (e.g., the device authorized to modify the security state). The initiating device (e.g., the trusted device) initiates the process 300 with a non-initiating device (e.g., the target device) to modify the security state of the target device. In one or more implementations, the target device may be the initiating device and the trusted device may be the non-initiating device. In some examples, the trusted device may be a mobile device such as a phone, a tablet or a laptop computer, a wearable device such as a watch, or a stationary device such as a desktop computer.

At block 305, the process 300 begins by the trusted device detecting, using a first wireless protocol, that a target device is proximate and available for performing a security operation with the trusted device. In some aspects, the trusted device may establish an initial connection between the trusted and target devices. The initial connection may use a secure, standardized wireless protocol (e.g., Bluetooth) as a first wireless protocol to discover the other device and establish the initial connection. In some implementations, the trusted device may detect that the target device is available to perform the security operation with the trusted device after the target device transitions from a powered-off state. For example, the target device may be powered off and sometime after is powered on and initiates a cold-boot operation.

At block 310, the trusted device determines whether it is in an unlocked state. If the trusted device is in the unlocked state, then the process 300 proceeds to block 320. Otherwise, the process 300 proceeds to block 315 for further authorization state determination of the trusted device.

At block 315, the trusted device is not in the unlocked state but rather in a locked state, and determines whether less than a threshold amount of time has passed since the trusted device was last unlocked. If less than a threshold amount of time has passed since the trusted device was last unlocked, the process 300 proceeds to block 320.

When the trusted device has determined that either it is in an unlocked state, or it is in a locked state and less than a threshold amount of time has passed since the trusted device was last unlocked, at block 320, the trusted device determines that the trusted device is authorized to perform the security operation with the target device. In some aspects, the security operation may include causing the target device to modify its security state.

In one or more implementations, both the trusted device and the target device may be transmitting Bluetooth advertisements that indicate their current state. For example, the trusted device may advertise that it is unlocked, locked, locked but unlocked more than X minutes ago, etc., and the target device may advertise that it is ready to be armed. Each device can receive the other device's advertisement and then determine that the ranging should be performed (e.g., when the trusted device is unlocked or locked but unlocked more than a threshold amount of time ago and when the target device is ready to be armed). If one of these conditions is not met, then the devices won't perform the ranging (which is battery intensive).

In some aspects, the trusted device may establish a ranging connection between the trusted and target devices. In some aspects, the trusted device may use the initial connection to exchange ranging connection information with the target device to set up the ranging connection between the trusted and target devices. In some embodiments, the ranging connection is a wireless channel of a second wireless protocol (e.g., Wi-Fi) that is used to exchange ranging information (e.g., through a series of ranging operations) in order for the trusted device to determine whether the distance between the target and trusted devices satisfies a proximity condition or is within a particular range. The ranging connection may be encrypted, and/or may utilize encrypted ranging transmissions, to protect the exchanged ranging information from potential attackers.

At block 325, the trusted device performs, using the second wireless protocol, a ranging operation to determine a distance between the trusted and target devices. In some aspects, the trusted device may capture a sample distance measurement between the trusted and target devices.

At block 330, the trusted device determines that the measured distance between the trusted device and the target device satisfies a proximity condition, then the process 300 proceeds to block 335. If a determination is made that the measured distance does not satisfy the proximity condition and therefore the trusted and target devices are not within the desired range, then the process 300 ends. In some aspects, the proximity condition may correspond to a threshold distance that is preconfigured on the trusted device. In other aspects, the proximity condition may include one or more acceptable ranges of distance set by user configuration.

If the trusted device has determined that the trusted and target devices are within a range distance that satisfies the proximity condition, at block 335, the trusted device transmits security information through a secured (e.g., encrypted) channel to the target device to transition the target device from a first security state to a second security state. The secured channel may use a secured encryption key to encrypt communications in order to protect the security information. The security information (e.g., arming information, security keys, etc.) is used to modify the security state at the target device. In some implementations, the secured channel is established over the initial connection established to perform the detection at block 305 (e.g., using the first wireless protocol). In other implementations, the secured channel is established over a separate, different connection.

In some implementations, the security information transmitted by the trusted device to the target device causes the target device to modify its security state from the first security state to the second security state. In this regard, the initiation of the security state change is performed by the trusted device. In some implementations, the first security state of the target device may include a security state in which the target device is unlocked only by providing a passcode on the target device. In some implementations, the second security state of the target device may include a security state in which the target device is unlocked only by providing the passcode or by biometric authentication.

In some implementations, the initial connection used for advertising and discovering the availability of a device, the ranging connection used for the ranging operations, and the connection used to communicate the authorization data are different and separate connections. For example, the different connections use different protocols or different methods of communication (e.g., bands of a frequency spectrum, wireless protocols, etc.). For example, the data communicated across a particular connection is actually sent through a separate band of a frequency spectrum or network (e.g., the Internet). The different connections may provide different benefits. For example, the initial connection uses a first wireless protocol to provide ease of discovery and reduced power requirements, while the ranging connection uses a second wireless protocol for the precision of the wireless frequency and security features.

Figure 4:
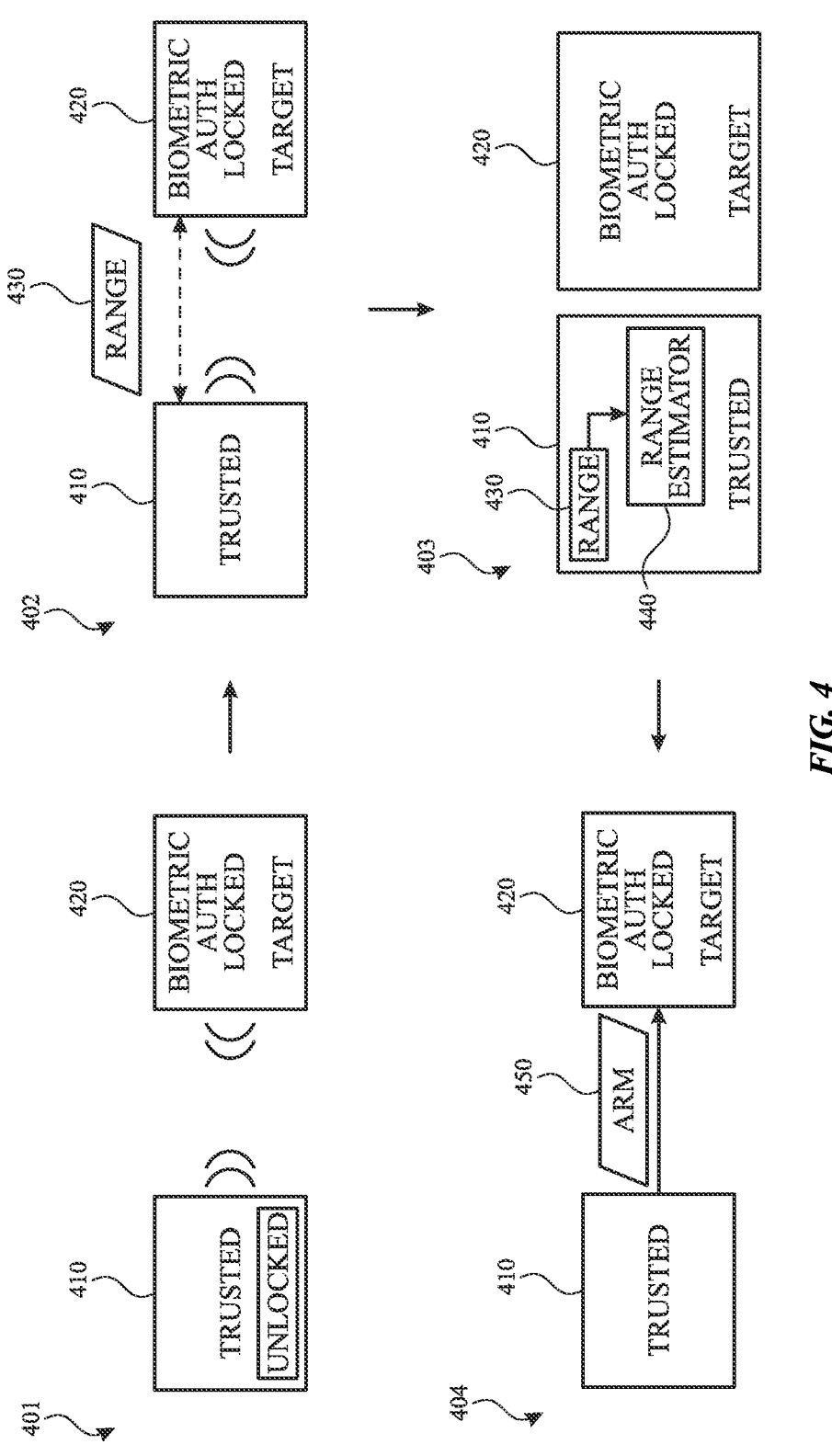
FIG. 4 illustrates an example of using secure ranging between a target device and a trusted device to modify the security state of a target device.

FIG. 4 illustrates an example of using secure ranging between a target device and a trusted device to modify the security state of a target device. The first stage 401 shows a trusted device 410 (e.g., a laptop computer, mobile phone, tablet, a smart watch, mobile phone, wireless headset, tablet, etc.) and a target device 420 (e.g., head-mountable device). The trusted device 410 may be a device that is authorized to make changes to the security state of the target device 420. In the first stage 401, the trusted device 410 detects, over a first wireless protocol, that the target device 420 is available for performing a security operation with the trusted device 410. For example, the trusted device 410 detects that the target device 420 is in a ready to be armed state and initiates the process to modify the security state of the target device 420.

In some aspects, the first wireless protocol may be Bluetooth. In some implementations, the detection performed by the trusted device 410 in the first stage 401 may be initiated in response to sensing that the target device 420 has transitioned from a powered-off state into a powered-on state or a first security state (e.g., target device can be unlocked only by inputting a security credential such as a passcode).

The first stage 401 also shows that the trusted device 410 determines that it is authorized to perform the security operation with the target device 420 when the trusted device 410 is in an unlocked state, or when the trusted device 410 is in a locked state and less than a threshold amount of time has passed since the trusted device 410 was last unlocked. As illustrated in FIG. 4, for example, the trusted device 410 is in an unlocked state.

In the second stage 402, responsive to determining, by the trusted device 410, that the trusted device 410 is authorized to perform the security operation with the target device 420, the trusted device 410 performs, using a second wireless protocol, a ranging operation to determine a distance between the trusted device 410 and the target device 420. A ranging connection over the second wireless protocol (depicted with a dashed line) has been set up between the trusted and target devices 410 and 420. In some aspects, the second wireless protocol may be Wi-Fi. The second stage 402 also shows that ranging information 430 may be exchanged between the trusted and target devices over the ranging connection.

The ranging information 430 allows the trusted device 410 to compute the distance between the two devices. For example, the third stage 403 shows that the trusted device 410 uses a range estimator 440 to analyze the ranging information 430. In some implementations, the trusted device 410 determines whether to continue with the security state change operation by determining whether the calculated range satisfies a proximity condition.

The fourth stage 404 shows that the trusted device 410, after determining that the devices are within an acceptable range by satisfying the proximity condition, transmits security information 450 to the target device 420. The security information 450 may be used to arm the target device 420 for unlocking, but not fully unlocking the target device 420, as an enhanced security feature for the target device 420. Various examples in this application are described with reference to an arming operation with the security information, but it should be understood by one skilled in the art that the novelty of the subject technology is not limited to such an arming operation. The arming operation may refer to any modification in security state at a target device, based on a relationship with a trusted device. In addition, the security information may sometimes be referred to as a key, however, the security information may include various different types of information. The security information may be a key used to unlock access to biometric authentication to allow the target device 420 to be fully unlocked by biometric authentication, while in other implementations the security information may be a key used to allow the target device 420 to be fully unlocked by providing a passcode on the target device 420. This allows the target device 420 to remain secured while in a pseudo-unlocked state when the trusted device 410 is within range.

FIG. 5 conceptually illustrates a process for a target device to use secure ranging with a trusted device to modify a security state of the target device. The process 500 is performed by the target device (e.g., the device whose security state is to be modified). The initiating device (e.g., the target device) initiates the process 500 with a non-initiating device (e.g., the trusted device) to modify the security state of the target device.

At block 505, the process 500 begins by the target device detecting, using a first wireless protocol, that a trusted device is proximate and available for performing a security operation with the target device. In some aspects, one of the trusted or target devices may establish an initial connection between the trusted and target devices. The initial connection may use a secure, standardized wireless protocol (e.g., Bluetooth) as a first wireless protocol to discover the other device and establish the initial connection. In some implementations, the target device may detect that the trusted device is available to perform the security operation with the target device after the target device transitions from a powered-off state. For example, the target device may be powered off, and sometime after, is powered on and initiates a cold-boot operation, where the detection operation performed by the target device may be part of the cold-boot operation.

At block 510, the target device determines whether the trusted device is in an unlocked state. If the trusted device is in the unlocked state, then the process 500 proceeds to block 525. Otherwise, the process 500 proceeds to block 515 for further authorization state determination of the trusted device. In some implementations, the trusted device may send, over an initial connection with the target device, state information that is indicative of whether the trusted device is in an unlocked state and time information indicating when the trusted device last transitioned into the unlocked state.

At block 515, the trusted device is not in the unlocked state but rather in a locked state, and the target device determines whether less than a threshold amount of time has passed since the trusted device was last unlocked. If less than a threshold amount of time has passed since the trusted device was last unlocked, the process 500 proceeds to block 525. Otherwise, the process 500 ends.

When the target device has determined that the trusted device is either in an unlocked state, or the trusted device is in a locked state and less than a threshold amount of time has passed since the trusted device was last unlocked, at block 525, the trusted device performs, using the second wireless protocol, a ranging operation to determine a distance between the trusted and target devices. In some aspects, the trusted device may capture a sample distance measurement between the trusted and target devices.

In some aspects, one of the trusted or target devices may establish a ranging connection between the trusted and target devices. In some aspects, the target device may use the initial connection to exchange ranging connection information with the trusted device to set up the ranging connection between the trusted and target devices. In some implementations, the ranging connection is a wireless channel of a second wireless protocol (e.g., Wi-Fi) that is used to exchange ranging information (e.g., through a series of ranging operations) in order for the target device to determine whether the distance between the target and trusted devices satisfies a proximity condition or is within a particular range. The ranging connection may be encrypted to protect the exchanged ranging information from potential attackers.

At block 530, the target device determines that the measured distance between the trusted device and the target device satisfies a proximity condition, then the process 500 proceeds to block 535. If a determination is made that the measured distance does not satisfy the proximity condition and therefore the trusted and target devices are not within the desired range, then the process 500 ends. If the target device has determined that the trusted and target devices are within range, at block 535, the trusted device transitions from a first security state to a second security state.

Figure 6:
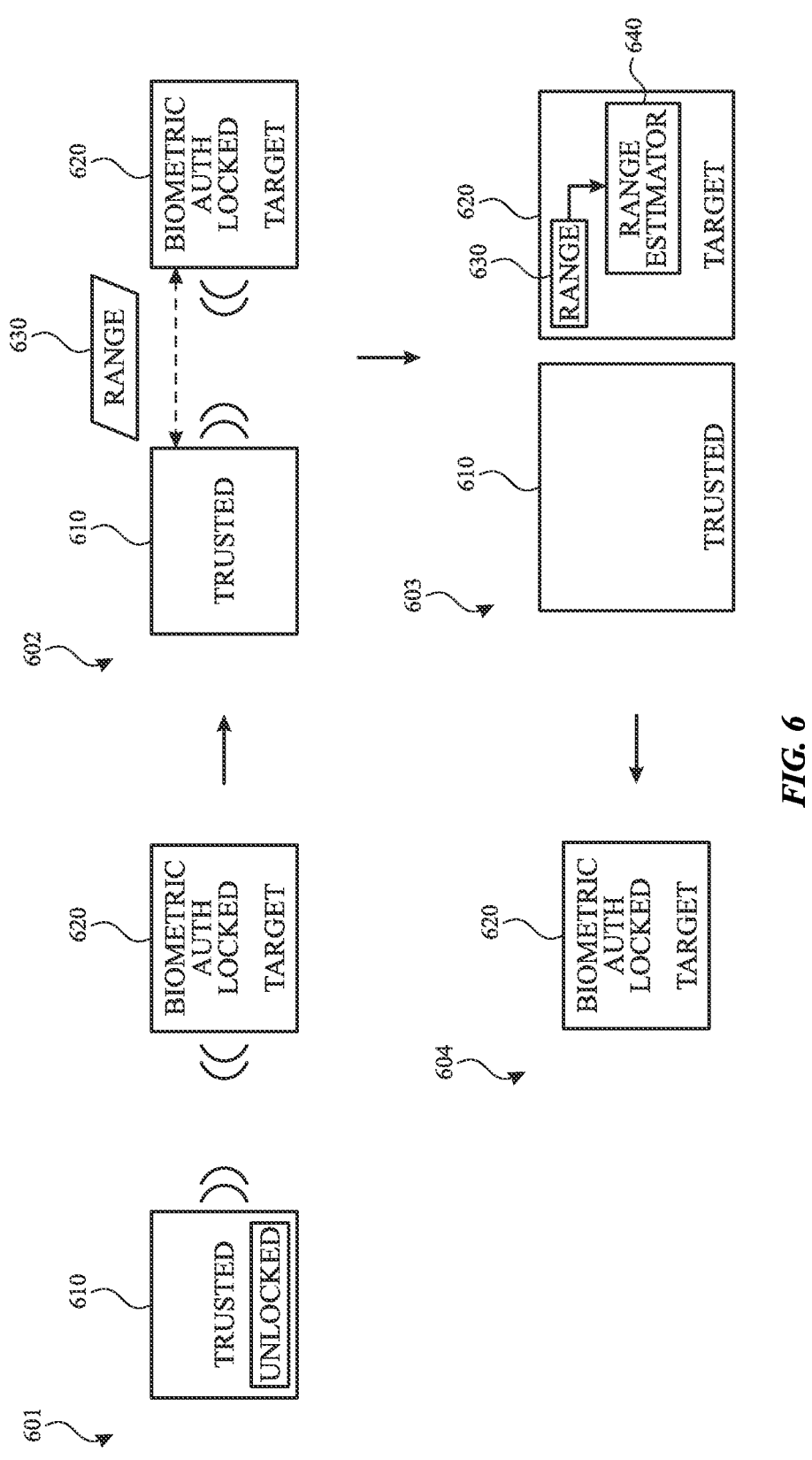
FIG. 6 illustrates another example of using secure ranging between a target device and a trusted device to modify the security state of the target device.

FIG. 6 illustrates another example of using secure ranging between a target device and a trusted device to modify the security state of the target device. The first stage 601 shows a trusted device 610 (e.g., a laptop computer, mobile phone, tablet, a smart watch, mobile phone, wireless headset, tablet, etc.) and a target device 620 (e.g., head-mountable device). The trusted device 610 may be a device that is authorized to facilitate changes in the security state of target device 620. In the first stage 601, the target device 620 detects, over a first wireless protocol, that the trusted device 610 is available for performing a security operation with the target device 620.

In some aspects, the first wireless protocol may be Bluetooth. In some implementations, the detection performed by the target device 620 in the first stage 601 may be initiated in response to the target device 620 having transitioned from a powered-off state into a powered-on state or a first security state (e.g., target device 620 can be unlocked only by providing a passcode).

The first stage 601 also shows that the target device 620 determines that the trusted device 610 is authorized to perform the security operation with the target device 620 when the trusted device 610 is in an unlocked state, or when the trusted device 610 is in a locked state and less than a threshold amount of time has passed since the trusted device 610 was last unlocked. As illustrated in FIG. 6, for example, the trusted device 610 is in an unlocked state. For example, the target device 620 detects the trusted device 610 in the unlocked state or was recently in the unlocked state and initiates the process to modify the security state of the target device 620.

In the second stage 602, responsive to determining, by the target device 610, that the trusted device 610 is authorized to perform the security operation with the target device 620, the target device 620 performs, using a second wireless protocol, a ranging operation to determine a distance between the trusted device 610 and the target device 620. A ranging connection over the second wireless protocol (depicted with a dashed line) has been set up between the trusted and target devices 610 and 620. In some aspects, the second wireless protocol may be Wi-Fi. The second stage 602 also shows that ranging information 630 may be exchanged between the trusted and target devices 610 and 620 over the ranging connection.

The ranging information 630 allows the target device 620 to compute the distance between the two devices. For example, the third stage 603 shows that the target device 620 uses a range calculator 640 to analyze the ranging information 630. In some implementations, the target device 620 determines whether to continue with the security state change operation by determining whether the calculated range satisfies a proximity condition.

The fourth stage 604 shows that the target device 620, after determining that the devices are within an acceptable range by satisfying the proximity condition, transitions from the first security state to a second security state. For example, the target device 620 may arm itself by not fully unlocking itself as an enhanced security feature for the target device 620. By transitioning to the second security state, the target device 620 may unlock access to biometric authentication and thereby allow the target device 620 to be fully unlocked via the biometric authentication, while in other implementations the transition into the second security state allows the target device 620 to be fully unlocked by providing a passcode on the target device 620. This allows the target device 620 to remain secured while in a pseudo-unlocked state when the trusted device 610 is within range.

Figure 7:
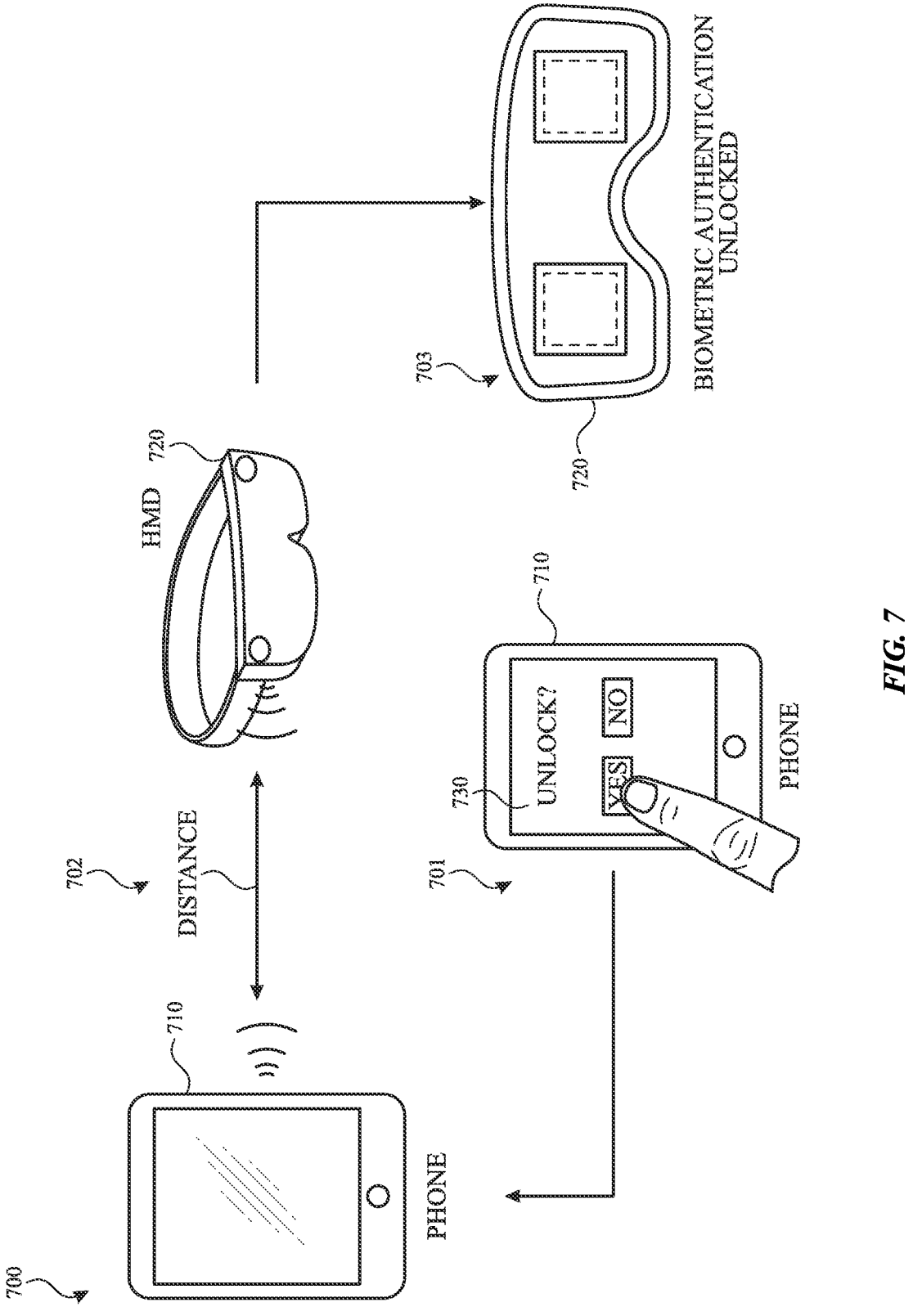
FIGS. 7-9 illustrate different sequence diagrams for providing secure ranging when modifying a security state of a target device from a trusted device.
Figure 8:
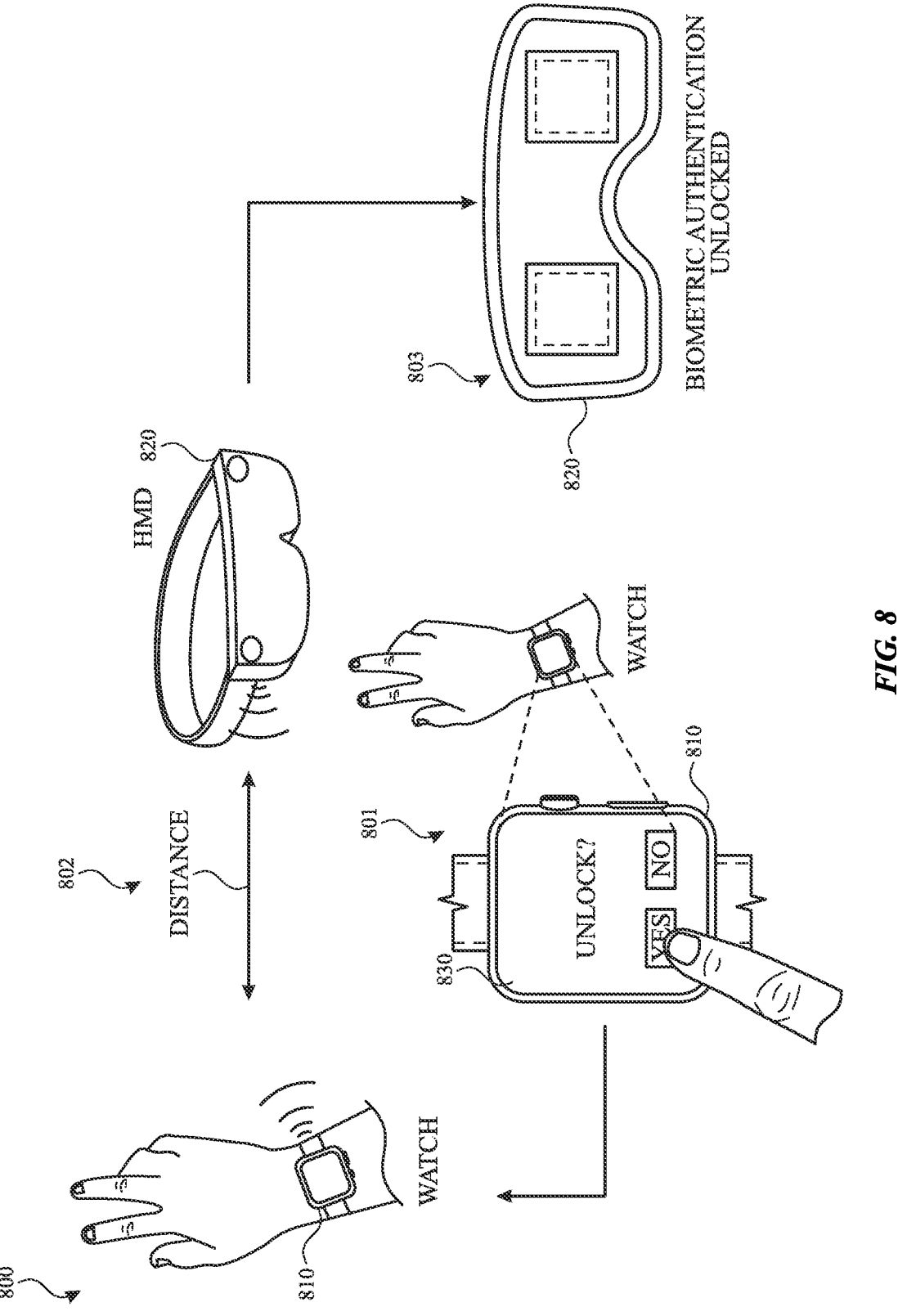
Figure 9:
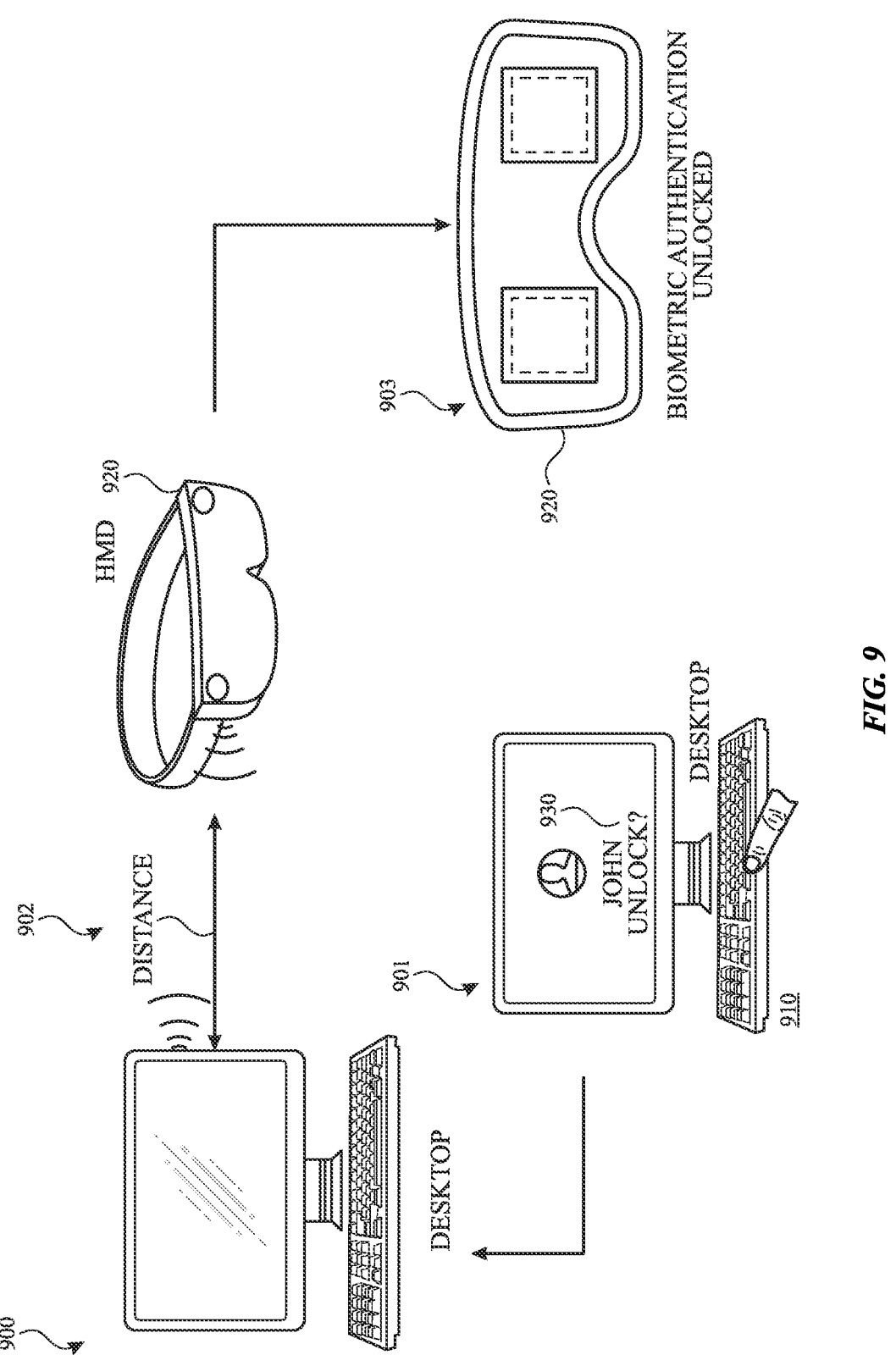

FIGS. 7-9 illustrate different sequence diagrams for providing secure ranging when modifying a security state of a target device from a trusted device. In FIG. 7, a sequence diagram 700 illustrates a first example for providing secure ranging when modifying a security state of a target device from a trusted device. A first stage 701 shows the target device 720 and trusted device 720 of FIG. 4. In this example, the target device 720 is a head-mountable device (e.g., the head-mountable device 100) and the trusted device 710 is a mobile device such as a mobile phone. In other aspects, the trusted device 710 may be a tablet.

The first stage 701 also shows that trusted device 710 provides a user with an option to transition the trusted device 710 into an unlocked state. In this example, the first stage 701 shows that the user initiates an unlock operation 730, transitioning the trusted device 710 from a locked state into the unlocked state. In one or more implementations, the trusted device 710 may transition back to the locked state after being in the unlocked state for a prescribed duration of time.

As part of the first stage 701, the trusted device 710 may determine that the trusted device 710 is authorized to perform a security operation with the target device 720 when the trusted device 710 is in an unlocked state, or when the trusted device 710 is in a locked state and less than a threshold amount of time has passed since the trusted device 710 was last unlocked. In some aspects, further as part of the first stage 701, the trusted device 710, using a first wireless protocol such as Bluetooth, may detect that the target device 720 is available for performing the security operation with the trusted device 710.

A second stage 702 shows that a ranging connection over a second wireless protocol such as Wi-Fi has been established between the target device 710 and the trusted device 720. The second stage 702 also shows that the trusted and target devices 710 and 720 exchange range data as part of a secure ranging process. In the second stage 702, the trusted device 720 determines that the target device 720 is within a distance that satisfies a proximity condition. In some implementations, the target and trusted devices use a secure ranging operation to determine whether the devices are within a desired range.

A third stage 703 shows that the target device 720 is transitioned from a first security state to a second security state. In some implementations, the trusted device 710 transmits, in response to a determination that the distance satisfies the proximity condition, using the first wireless protocol, security information to the target device 720 to cause the target device 720 to transition to the second security state. In some aspects, the first security state includes a security state in which the target device 720 is unlocked only by providing a passcode and the second security state includes a security state in which the target device 720 is unlocked by providing the passcode or by biometric authentication. In this example, the third stage 703 shows that the target device 720 can be fully unlocked by biometric authentication since access to perform biometric authentication at the target device 720 was unlocked.

In FIG. 8, a sequence diagram 800 illustrates a second example for providing secure ranging when modifying a security state of a target device from a trusted device. For brevity and ease of illustration, only differences will be discussed with reference to FIG. 7. A first stage 801 shows the target device 820 and trusted device 820 of FIG. 4. In this example, the target device 820 is a head-mountable device (e.g., the head-mountable device 100) and the trusted device 810 is a wearable device such as a smartwatch. The first stage 801 shows that the user initiates an unlock operation 830, transitioning the trusted device 810 from a locked state into the unlocked state. As part of the first stage 801, the trusted device 810 may determine that the trusted device 810 is authorized to perform a security operation with the target device 820 when the trusted device 810 is in an unlocked state, or when the trusted device 810 is in a locked state and less than a threshold amount of time has passed since the trusted device 810 was last unlocked.

In a second stage 802, the trusted device 820 determines that the target device 820 is within a distance that satisfies a proximity condition. A third stage 803 shows that the target device 820 is transitioned from a first security state to a second security state. In this example, the third stage 803 shows that the target device 820 can be fully unlocked by biometric authentication since access to perform biometric authentication at the target device 820 was unlocked.

In FIG. 9, a sequence diagram 900 illustrates a third example for providing secure ranging when modifying a security state of a target device from a trusted device. For brevity and ease of illustration, only differences will be discussed with reference to FIG. 7. A first stage 901 shows the target device 920 and trusted device 920 of FIG. 4. In this example, the target device 920 is a head-mountable device (e.g., the head-mountable device 100) and the trusted device 910 is a stationary device such as a desktop computer. The first stage 901 shows that the user initiates an unlock operation 930, transitioning the trusted device 910 from a locked state into the unlocked state. As part of the first stage 901, the trusted device 910 may determine that the trusted device 910 is authorized to perform a security operation with the target device 920 when the trusted device 910 is in an unlocked state, or when the trusted device 910 is in a locked state and less than a threshold amount of time has passed since the trusted device 910 was last unlocked.

In a second stage 902, the trusted device 920 determines that the target device 920 is within a distance that satisfies a proximity condition. A third stage 903 shows that the target device 920 is transitioned from a first security state to a second security state. In this example, the third stage 903 shows that the target device 920 can be fully unlocked by biometric authentication since access to perform biometric authentication at the target device 920 was unlocked.

As described above, one aspect of the present technology is the gathering and use of data available from specific and legitimate sources for allowing a trusted device to modify a security state of a target device. The present disclosure contemplates that in some instances, this gathered data may include personal information data that uniquely identifies or can be used to identify a specific person. Such personal information data can include audio data, demographic data, location-based data, online identifiers, telephone numbers, email addresses, home addresses, biometric data or records relating to a user's health or level of fitness (e.g., vital signs measurements, medication information, exercise information, motion information, heartrate information workout information), date of birth, or any other personal information.

The present disclosure recognizes that the use of such personal information data, in the present technology, can be used to the benefit of users. For example, the personal information data can be used for allowing a trusted device to modify a security state of a target device.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the example of generating physiological predictions, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data.

Figure 10:
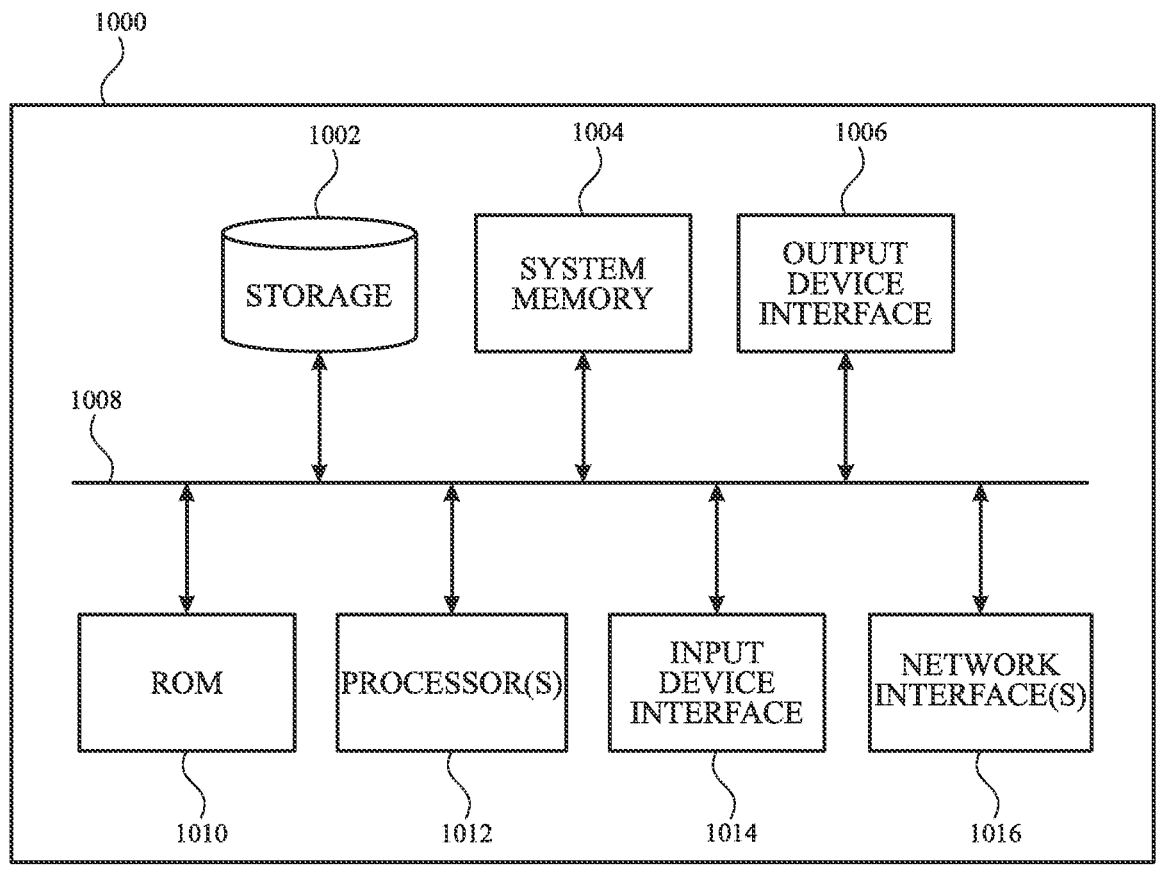
FIG. 10 conceptually illustrates an example of an electronic system with which some embodiments of the subject technology are implemented.

FIG. 10 illustrates an electronic system 1000 with which one or more implementations of the subject technology may be implemented. The electronic system 1000 can be, and/or can be a part of, the head-mountable device 100 shown in FIG. 1, the trusted device (410, 610, 710, 810, 910) shown in FIGS. 4, 6-9, and/or the target device (420, 620, 720, 820, 920) shown in FIGS. 4, 6-9. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a flash drive and its corresponding solid state drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input device interface 1014 and output device interface 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the head-mountable device 100 shown in FIG. 1, the trusted device (410, 610, 710, 810, 910) shown in FIGS. 4, 6-9, and/or the target device (420, 620, 720, 820, 920) shown in FIGS. 4, 6-9, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to micropro-cessor or multi-core processors that execute software, one or more implementations are performed by one or more integrated circuits, such as ASICs or FPGAs. In one or more implementations, such integrated circuits execute instructions that are stored on the circuit itself.

Many of the above-described features and applications are implemented as software processes that are specified as a set of instructions recorded on a computer readable storage medium (also referred to as a computer readable medium). When these instructions are executed by one or more computational or processing unit(s) (e.g., one or more processors, cores of processors, or other processing units), they cause the processing unit(s) to perform the actions indicated in the instructions. In this specification, the term "software" is meant to include firmware residing in read-only memory or applications stored in magnetic storage which can be read into memory for processing by a processor. Also, in some embodiments, multiple software programs can be implemented as sub-parts of a larger program while remaining distinct software programs. In some embodiments, multiple software programs can also be implemented as separate programs. Finally, any combination of separate programs that together implement a software program described here is within the scope of the subject technology. In some embodiments, the software programs, when installed to operate on one or more electronic systems, define one or more specific machine implementations that execute and perform the operations of the software programs.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "trusted device", "target device", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
detecting, by a first device using a first wireless protocol, that a proximate second device is available for performing a security operation with the first device;
determining, by the first device, that the first device is authorized to perform the security operation with the second device when the first device is in a locked state and less than a threshold amount of time has passed since the first device was last unlocked;
responsive to determining, by the first device, that the first device is authorized to perform the security operation with the second device, performing, by the first device using a second wireless protocol, a ranging operation to determine a distance between the first device and the second device, the second wireless protocol being different than the first wireless protocol;
determining, by the first device, whether the distance satisfies a proximity condition;
in response to a determination that the distance satisfies the proximity condition, transmitting, by the first device and using the first wireless protocol, security information to the second device to transition the second device from a first security state to a second security state; and
in response to a determination that the first device is in an unlocked state and that at least a prescribed duration of time has passed since the second device transitioned from the first security state to the second security state, transmitting, by the first device and using the first wireless protocol, the security information to the second device.

2. The method of claim 1, wherein the first security state comprises a security state in which the second device is unlocked only by providing a passcode and the second security state comprises a security state in which the second device is unlocked by providing the passcode or by biometric authentication.

3. The method of claim 1, wherein the first wireless protocol comprises Bluetooth and the second wireless protocol comprises Wi-Fi.

4. The method of claim 1, wherein the first device detects that the second device is available to perform the security operation with the first device after the second device transitions from a powered-off state.

5. A device comprising:
a memory; and
at least one processor configured to:
determine whether the device is in a locked state and less than a threshold amount of time has passed since the device was last unlocked;
responsive to a determination that the device is in the locked state and less than the threshold amount of time has passed since the device was last unlocked, perform, using a first wireless protocol, a ranging operation to determine a distance between the device and the other device;
determine whether the distance satisfies a proximity condition; and
in response to a determination that the distance satisfies the proximity condition, transmit, using a second wireless protocol, security information to the other device to modify a security state of the other device, the second wireless protocol being different than the first wireless protocol; and
in response to a determination that the device is in an unlocked state and that at least a prescribed duration of time has passed since the security state of the other device was modified, transmit, using the first wireless protocol, the security information to the other device.

6. The device of claim 5, wherein the security state of the other device is modified by transitioning the other device from a first security state to a second security state.

7. The device of claim 6, wherein the first security state comprises a security state in which the other device is unlocked only by providing a passcode and the second security state comprises a security state in which the other device is unlocked by providing the passcode or by biometric authentication.

8. The device of claim 5, wherein the first wireless protocol comprises Wi-Fi and the second wireless protocol comprises Bluetooth.

9. The device of claim 5, wherein the at least one processor is further configured to:
detect, using the first wireless protocol, that the other device is available for performing a security operation with the device; and
determine whether the other device is authorized to perform the security operation with the device when the other device is in the unlocked state, or when the other device is in the locked state and less than a threshold amount of time has passed since the other device was last unlocked,
wherein the ranging operation is further performed responsive to a determination that the other device is authorized to perform the security operation with the device.

10. The device of claim 9, wherein the at least one processor is further configured to detect that the other device is available to perform the security operation with the device after the other device is transitioned from a powered-off state.

11. A method, comprising:
determining, by a first device using a first wireless protocol, whether a second device proximate to the first device is in a locked state and less than a threshold amount of time has passed since the second device was last unlocked;

detecting, by the first device, that the second device is available and authorized to perform a security operation with the first device;

responsive to determining, by the first device, that the second device is in the locked state, less than the threshold amount of time has passed since the second device was last unlocked, and is authorized, performing, by the first device using a second wireless protocol, a ranging operation to determine a distance between the first device and the second device, the second wireless protocol being different than the first wireless protocol;

determining, by the first device, whether the distance satisfies a proximity condition; and in response to a determination that the distance satisfies the proximity condition, modifying a security state of the first device.

12. The method of claim 11, wherein the security state of the first device is modified by transitioning the first device from a first security state to a second security state.

13. The method of claim 12, wherein in response to a determination that the distance satisfies the proximity condition, further comprising receiving, by the first device and using the first wireless protocol, security information from the second device to transition the first device from the first security state to the second security state.

14. The method of claim 12, wherein the first security state comprises a security state in which the first device is unlocked only by providing a passcode and the second security state comprises a security state in which the first device is armed and access to unlock the second device by biometric authentication or by providing a passcode is unlocked.

15. The method of claim 14, wherein the access to unlock the second device by biometric authentication remains unlocked for a prescribed duration of time.

16. The method of claim 14, wherein the access to unlock the first device is unlocked only by providing the passcode or by detecting that the second device is in an unlocked state when the access to unlock the first device is not authorized after a prescribed duration of time has passed since the first device transitioned into the second security state.

17. The method of claim 12, wherein the first device transitions into the first security state from a powered-off state.

* * * * *